June 1, 1926.
J. L. FARMER
1,586,891
AUTOMATIC RETAINING VALVE FOR AIR BRAKES
Filed June 9, 1925
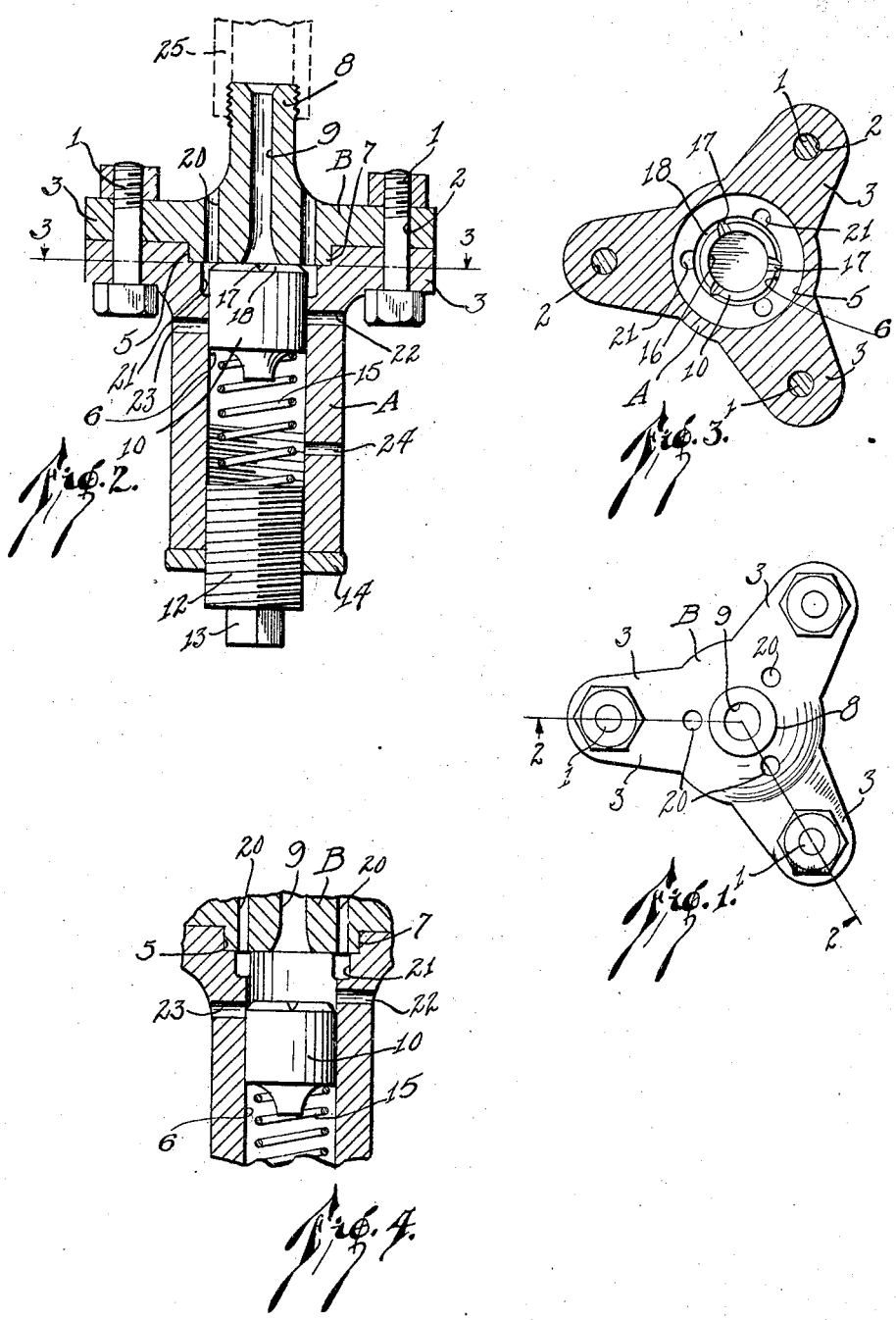
INVENTOR
J. L. FARMER
BY
ATTORNEYS Patented June 1, 1926.

1,586,891

UNITED STATES PATENT OFFICE.

JOHN LEO FARMER, OF CHICAGO, ILLINOIS.

AUTOMATIC RETAINING VALVE FOR AIR BRAKES.

Application filed June 9, 1925. Serial No. 36,006.

My invention relates to improvements in automatic retaining valves for air brakes, and it consists in the combinations, constructions, and arrangements herein described and claimed.

An object of my invention is to provide an automatic air retaining valve for air brakes which will permit the air from the brake cylinders to exhaust slowly when the engineer moves the brake lever in the engine cab so as to release the brakes and to cause the pumps on the locomotive to again fill the compressed air tank on the locomotive and the compressed air tanks beneath each car. This slow exhaust of the air from the brake cylinder gives the pumps ample time to fill the various compressed air tanks.

I have found that where trains are descending a long grade, the air in the compressed air tanks is exhausted to such an extent that there is not sufficient air in the brake cylinders to again set the brakes if the engineer so wishes. This is due to the fact that it takes a certain length of time to again build up the pressure within the compressed air tanks carried by the cars, and if the brakes have to be set during this time there will not be sufficient air to apply the brakes and slow down the train. My device permits the air from the brake cylinders to exhaust slowly, thus keeping the brakes partially applied while permitting the cylinders beneath the cars to be recharged with air. It will therefore be seen that if the brakes have to be applied during the recharging of the auxiliary tanks carried by the cars, a small amount of air will set the brakes because the brake cylinders already have a certain amount of air therein.

A further object of my invention is to provide a device of the type described which has adjustable means for permitting the rapid exhaust of air from the brake cylinder above a certain number of pounds pressure, and then for slowly exhausting the remaining quantity of air in the cylinder so as to slowly release the brakes, thus giving the pumps ample time to recharge the auxiliary tanks disposed beneath the cars.

A further object of my invention is to provide a device of the character described which is simple in construction, durable and thoroughly practical for the purposes intended.

Other objects and advantages will appear in the following specification, and the novel features of the invention will be particularly pointed out in the appended claims.

My invention is illustrated in the accompanying drawings, forming part of this application, in which—

Figure 1 is a top plan view of an embodiment of my invention,

Figure 2 is a sectional view along the line 2—2 of Figure 1,

Figure 3 is a sectional view along the line 3—3 of Figure 2, and

Figure 4 is a fragmentary sectional view of the mechanism as illustrated in Figure 2 in an operative position.

My automatic retaining valve for air brakes is intended for disposition directly on the exhaust port of the standard triple valve employed in the ordinary type of air brakes for railroad cars and locomotives.

Ordinarily air is permitted to exhaust from the triple valve directly through the exhaust port so as to release the brakes. This exhaust of air is very rapid and quickly releases the brakes. It sometimes happens that the air within the auxiliary tanks beneath the cars is not of the required pressure, and therefore if the engineer again wishes to apply the brakes, the brakes will not seat properly due to the fact that there is not sufficient pressure in the auxiliary tanks to apply the brakes. With my device I permit the slow exhaust of air from the brake cylinders, and if therefore the engineer again wishes to apply the brakes, he can do so because it takes a small quantity of additional air to again set the brakes.

In carrying out my invention, I provide a valve body member comprising two parts A and B. The member A is substantially cylindrical in form and is secured to the member B by the projection of bolts 1 through aligned openings 2 in radially projection portions 3 of the parts A and B respectively. Nuts 4 are disposed upon the bolts 1 so as to draw the parts A and B into close engagement with one another.

The part A has an enlarged portion 5 of the central bore 6 at the mouth thereof into which a bossed portion 7 of the part B is received. The part B is provided with an upwardly extending, exteriorly threaded neck portion 8 which has a passage 9 extending longitudinally therethrough and communicating at its lowermost end with the interior of the part A.

A piston valve 10 is slidably disposed in the central bore 6 of the member A and closely engages the side walls thereof. The body member A has an interiorly threaded portion 11 at the lowermost end thereof in which a threaded plug 12 is received which may be moved longitudinally upon rotation of the plug as by engagement of a wrench or the like with an angular longitudinal projection 13 at the bottom of the plug. A lock nut 14 is provided on the plug 12 so as to lock the plug against movement relative to the member A.

A compression spring 15 is disposed within the bore 5 of the member A between the plug 12 and the inner end of the piston valve 10. The piston valve 10, see Figure 3, has a recess 16 in the top wall thereof and is provided with transverse grooves 17 across the uppermost portions of the piston valve between the outer wall and the recess 16.

The outer peripheral upper edge of the piston valve 10 is beveled as shown at 18. The member B has three passages 20 extending therethrough parallel with the axis of the bore 6 and at equal distances from one another. The axes of the passages 20 lie slightly beyond the walls of the bore 6.

The member A has bores 21 with their axes in registration with the axes of the passages 20. The bores 21 extend into the member A for a distance and communicate with the bore 6.

The body member A has a pair of exhaust ports 22 and 23 extending transversely through the side walls of the member, the port 22 being above the port 23. The body member A has a vent passage 24 therethrough below the lowermost end of the travel of the piston valve 10. This vent passage is for the purpose of preventing the compression of air beneath the piston valve which might otherwise hinder the efficient operation of the device.

From the foregoing description of the various parts of the device, the operation thereof may be readily understood. The device is attached to the exhaust port of the standard triple valve found on all freight cars and passenger cars employed throughout the United States. This exhaust port is indicated in Figure 2 in dotted lines by the tubular member 25. The member 25 is threaded on its inner wall and engages with the threaded neck 8.

Let us assume now that a train equipped with cars having my improved automatic pressure retaining valves is moving upon a down grade, and that the engineer has released air under pressure from the engineer's line for the purpose of actuating the air brakes. Normally the brakes will remain set as long as the air is released from the engineer's line. When the engineer has retarded the speed of the train to what he thinks is a safe speed, he will move the air brake lever so as to move the triple valve to cause the valve to permit the air in the brake cylinder to exhaust and to connect the auxiliary tank in the car with the pumps for forcing additional air back into the tanks. Without my device, the air would quickly exhaust from the brake cylinders and would therefore quickly release the brakes. With my device, the air will flow through the exhaust port 25 from the brake cylinder and will seep past the grooves 17, and the annular groove made by the beveled edge 18 and the body member A, and thence to the other outlet passageways 20. This will permit the air to escape very slowly and the brakes will therefore be slowly released.

The plug 12 can be adjusted to vary the tension of the spring 15 and have the piston 10 operate at different pressures. If the pressure within the brake cylinder exceeds the force exerted by the spring 15, the air will quickly drive the piston toward the plug 12, thus permitting the air to quickly exhaust from the cylinder until the pressure within the cylinder balances the force exerted by the spring 15, whereupon the piston 10 will again seat and will cause the remaining air in the cylinder to exhaust slowly.

The device is self-cleaning in that the rush of air through the passageways 9 and into the recess 16 will drive any foreign matter out through the passageways 20 and the passageways 21 and 22.

It should be noted that one of the outstanding features of my invention over the ordinary type of retaining valve, is that it is automatic in operation and that it is self-cleaning. It is practically impossible to plug up the passages 20, 22 or 23 since sand or any substances admitted to the passages will be blown out upon the first actuation of the device.

I claim:

1. An automatic pressure retaining valve of the character described comprising a tubular body member, a piston valve closely fitted within said body member and adapted for longitudinal movement therein, means for connecting the interior of said body member with the exhaust port of a standard triple valve for railroad air brakes, and a plurality of exhaust ports through said body member, certain of which are closed by said piston valve when at one end of its travel and which are open when the piston valve is moved as by air pressure from said exhaust.

2. An automatic pressure retaining valve of the character described comprising a tubular body member, a piston valve closely fitted within said body member and adapted for longitudinal movement therein, means for connecting the interior of said body member with the exhaust port of a standard triple valve for railroad air brakes, a plurality of exhaust ports through said body member, certain of which are closed by said piston valve when at one end of its travel and which are open when the piston valve is moved as by air pressure from said exhaust, and a spring for yieldingly holding said piston valve in a position to close certain of said vents.

3. An automatic pressure retaining valve of the character described comprising a tubular body member, a piston valve closely fitted within said body member and adapted for longitudinal movement therein, means for connecting the interior of said body member with the exhaust port of a standard triple valve for railroad air brakes, a plurality of exhaust ports through said body member, certain of which are closed by said piston valve when at one end of its travel and which are open when the piston valve is moved as by air pressure from said exhaust, a spring for yieldingly holding said piston valve in a position to close certain of said vents, and means for adjusting the compression of said spring at will.

4. The combination with an exhaust port of a standard triple valve for railroad air brakes, of automatic means for impeding the exhaust of air through said exhaust port, whereby the air may exhaust slowly, said means being constructed so as to permit the unobstructed exhaust of air when the pressure of the air exceeds a predetermined degree.

5. The combination with a brake cylinder having an exhaust port, of means attached to said exhaust port for causing the air to exhaust slowly from the port, said means being entirely controlled by the exhaust air, and means for permitting the quick exhaust of air when the pressure exceeds a predetermined point, and for slowly exhausting the remaining air after the pressure has dropped down to the predetermined point.

6. The combination with a brake cylinder having an exhaust port, of means attached to said exhaust port for causing the air to exhaust slowly from the port, said means being entirely controlled by the exhaust air, and means for permitting the quick exhaust of air when the pressure exceeds a predetermined point, and for slowly exhausting the remaining air after the pressure has dropped down to the predetermined point, said last named means being adjustable for various pressures.

7. The combination with a brake cylinder having an exhaust port, of a casing removably secured to said exhaust port, a piston slidably mounted in said casing, a spring means for seating said piston, said piston having grooves therein to permit the slow exhaust of air when said piston is seated, said casing having air outlet openings adapted to be uncovered by the movement of said piston, said springs being adjustable to cause the piston to move at various pressures and to again seat when this pressure has been reached.

JOHN LEO FARMER.